(12) United States Patent
George et al.

(10) Patent No.: US 9,336,557 B2
(45) Date of Patent: May 10, 2016

(54) APPARATUS AND METHODS FOR PROCESSING OF MEDIA SIGNALS

(71) Applicant: Apple Inc., Cupertino, CA (US)

(72) Inventors: Brett D. George, Cupertino, CA (US); Changki Min, Cupertino, CA (US); David A. Leech, Cupertino, CA (US); Matthew X. Mora, Cupertino, CA (US); Niel D. Warren, Cupertino, CA (US); Rajabali M. Koduri, Cupertino, CA (US); Ronald N. Isaac, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 384 days.

(21) Appl. No.: 13/875,215

(22) Filed: May 1, 2013

(65) Prior Publication Data

US 2013/0293558 A1  Nov. 7, 2013

Related U.S. Application Data

(60) Provisional application No. 61/641,827, filed on May 2, 2012.

(51) Int. Cl.
*G06F 15/16* (2006.01)
*G06T 1/20* (2006.01)

(52) U.S. Cl.
CPC .......... *G06T 1/20* (2013.01); *G10K 2210/3042* (2013.01)

(58) Field of Classification Search
None
See application file for complete search history.

(56) References Cited

U.S. PATENT DOCUMENTS

| 2011/0054857 A1* | 3/2011 | Moguchaya ............... 703/2 |
| 2012/0185671 A1* | 7/2012 | Bourd et al. ............... 712/27 |
| 2012/0249560 A1* | 10/2012 | Dickenson ............... 345/505 |

OTHER PUBLICATIONS

Emmanuel Gallo, Nicolas Tsingos. Efficient 3D Audio Processing on the GPU. ACM Workshop on General Purpose Computing on Graphics Processors, Aug. 2004, Los Angeles, United States. 2004. <inria-00606754>.*
Whalen, Sean. "Audio and the graphics processing unit." Author report, University of California Davis 47 (2005): 51.*

* cited by examiner

*Primary Examiner* — Phi Hoang
(74) *Attorney, Agent, or Firm* — Meyertons, Hood, Kivlin, Kowert & Goetzel, P.C.

(57) ABSTRACT

Methods and apparatus for processing media signals. In one embodiment, a data processing device processes fixed and variable rate data using a first and second processing unit. The processing comprises real-time processing of audio/video signals by a graphics processing unit (GPU) and/or central processing unit (CPU). The processing units process data efficiently by establishing one processor as always processing variable rate data, and using one or more schemes for determining processor will process fixed rate data. A shared memory enables the processors to communicate with one another in order to determine which will process the fixed rate data. In one scheme for determining which of the processors will process the fixed rate data the second processor need merely be unlocked. In another embodiment, the second processor must be unlocked and immediately available.

20 Claims, 11 Drawing Sheets

APPARATUS AND METHODS FOR PROCESSING OF MEDIA SIGNALS

PRIORITY CLAIM

This application claims priority to U.S. Provisional Application No. 61/641,827, titled "Apparatus and Methods for Processing of Media Signals," and filed May 2, 2012, the inventors being Brett D. George, Changki Min, David A. Leech, Matthew X. Mora, Niel D. Warren, Rajabali M. Koduri, and Ronald N. Isaac, which is incorporated by reference in its entirety as if fully disclosed herein.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates generally to the field of signal processing. More specifically, the present invention relates in one exemplary aspect to methods and apparatus for real-time processing of audio and video signals by a graphics processing unit and/or a central processing unit.

DESCRIPTION OF RELATED TECHNOLOGY

The evolving capabilities of digital electronics have created a significant consumer appetite for multimedia capable devices (e.g., personal media players, etc.). Unfortunately, the computationally intensive nature of multimedia requires that multimedia capable devices must devote significant resources (e.g., software and/or hardware) for multimedia processing. Generally, coding and decoding of multimedia files is handled within specialized so-called "codecs"; software codecs and hardware codecs are widely used in many consumer electronics.

Typical implementations of multimedia capable devices (such as the iPod, iPhone, iPad, and MacBook, manufactured by the Assignee hereof) include a number of processing elements (such as a central processing unit (CPU) and/or one or more specialized graphics processing units (GPU)), that can perform codec operations (e.g., compression, decompression, mathematical transforms, etc.). Most consumer devices must perform multimedia processing in addition to other processing tasks (e.g., user interface, network interface, applications, etc.). Multimedia processing may include processing of audio and video signals.

Processing audio signals may include compression/decompression and coding/decoding. Other functions may also be included. Audio processing is a deterministic process, and can be performed at a substantially fixed rate. Additionally, most audio codec implementations additionally require that the audio playback is played at a fixed rate (i.e., the audio frame rate). In modern computing, audio processing is usually completed much faster than the audio frame rate requires; consequently, a CPU can flexibly schedule audio processing with other CPU tasks. However, in the event that an audio frame is not processed in time, the processing is "dropped," and a skip or glitch in the audio signal can be heard when the signal is played.

Processing video signals may include compressing a digital signal representation of graphics, and subsequently decompressing the signal for use at a display apparatus. Other functions, such as generating 2D and 3D graphics renderings, may also be included. Video processing is generally unpredictable. For example, encoding and decoding of Motion Picture Experts Group (MPEG) formatted video media can significantly vary from frame to frame. In fact, the time required for video compression/decompression largely determines the resultant video frame rate. Additionally, video processing includes a buffer period such that the video processing will not be "dropped" as easily as occurs in audio processing.

Further, video processing commands cannot be preempted (interrupted) once started; i.e., once a GPU starts an instruction, the GPU must either complete the instruction, or abort the operation entirely.

Figure 1:
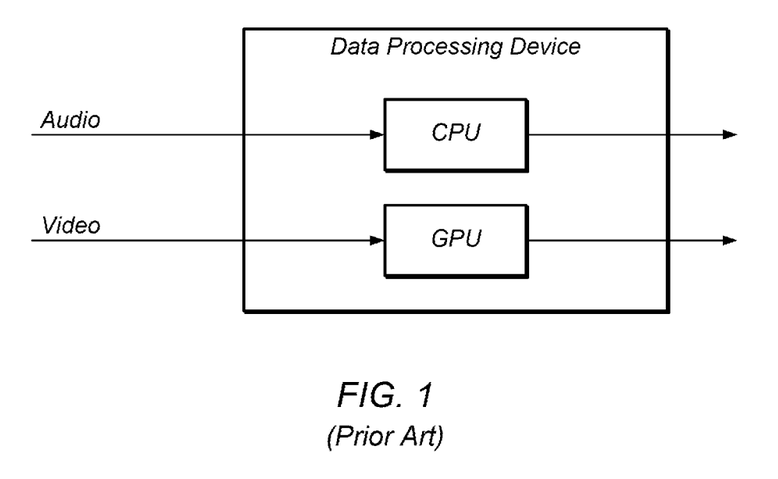
FIG. 1 is a functional block diagram illustrating a prior art device for processing video and audio signals.

Graphics processing is often performed by a GPU, whereas audio processing typically occurs at the CPU. Hence, a typical prior art system generally employs one CPU for audio processing, and one GPU for video processing. For example, FIG. 1 illustrates one prior art multimedia device for processing video and audio signals. As shown, the prior art multimedia device executes audio processing as a software process executed on a CPU, and performs video processing within a dedicated GPU.

As illustrated in FIG. 1, during prior art operation, the CPU executes audio compression/decompression, and the GPU performs video compression/decompression. Traditional schemes for GPU operation significantly underutilize the GPU. Specifically, since graphics processing is unpredictable, scheduling tasks around the existing graphics processing burden is problematic. Moreover, while audio processing could greatly benefit from execution on the GPU (e.g., due to analogous hardware and software structures, as described in greater detail hereinafter), the rigid timing requirements of audio processing bar GPU execution. In particular, incorporating audio processing within the GPU will likely result in occasional glitches; for example, when the video processing prevents audio processing from occurring in a timely fashion.

Accordingly, what is needed is an improved method for leveraging the GPU processing capabilities, such as for example when the GPU is idle. Ideally, such implementations would further maximize the specialized capabilities of the GPU by assisting in the rendering of audio. However, in order to maintain the existing level of user experience, GPU assistance should not degrade audio replay (e.g., glitches, excessive time delays, poor fidelity, etc. are unacceptable).

SUMMARY OF THE DISCLOSURE

The present invention addresses the foregoing needs by providing methods and apparatus for effectively leveraging GPU processing capabilities.

In a first aspect of the invention, a computerized apparatus configured to process data is disclosed. In one embodiment, the apparatus includes: a central processing unit adapted to process audio data; a graphics processing unit in data communication with the central processing unit and adapted to process at least audio and video data; a storage device in data communication with the central and graphics processing units and configured to enable the central and graphics processing units to read and write thereto; and a computer application configured to run on the central processing unit. In one variant, the computer program is configured to, when executed, utilize information in the storage device to determine whether the audio data is to be processed at the central or the graphics processing unit. The determination is based at least in part on a locking state of the graphics processing unit at a time of a request for processing of the audio data is received.

In another variant, the computerized apparatus is a mobile wireless device with e.g., touch screen interface and which is configured to process both audio and video data.

In a second aspect of the invention, apparatus for processing data is disclosed. In one embodiment, the apparatus includes: a first processing unit adapted to process first data; a second processing unit adapted to process first and second data; a storage device adapted to enable the first and second processing units to read and write thereto; and a computer application configured to run on the first processing unit. In one variant, the computer program is configured to, when executed, utilize information in the storage device to determine whether the first data will be processed at the first or the second processing device.

In a third aspect of the invention, a method for efficiently processing audio and video data at a processing device is disclosed. In one embodiment, the processing device includes a central processing unit (CPU) and a graphics processing unit (GPU), and the method includes: receiving a request for processing audio data; determining whether the GPU is in a first operational state; determining whether the GPU is in a first availability state; when the GPU is in the first operational state and the first availability state, transmitting the audio data thereto for processing; and when the GPU is not in both the first operational state and the first availability state, causing the audio data to be processed at the CPU.

In a fourth aspect of the invention, a method for delegating processing of first data from a first to a second processing unit of a processing apparatus is disclosed. In one embodiment, the method includes: writing a first plurality of tasks to a queue associated with the second processing unit, the first plurality of tasks relating to processing second data at the second processing unit; performing the first plurality of tasks at the second processing unit; and determining whether a second plurality of tasks may be written to the queue, the second plurality of tasks relating to processing the first data, and the determination based at least in part on an evaluation of the first plurality of tasks in the queue and a level of completion of the performance of the first plurality of tasks.

In a fifth aspect of the invention, a computer readable apparatus is disclosed. In one embodiment, the apparatus includes a storage medium having at least one program disposed thereon, the program configured to, when executed, implement allocation of processing of first and second different types of data between two or more processing units.

In a sixth aspect of the invention a processing system is disclosed. In one embodiment, the system includes both (i) one or more first type of processors, and (ii) one or more second type of processor, the first and second types being different. In one variant, the system is configured for use on a computerized device that processes both audio and video data, whether received in a common data stream, or separately.

Other features and advantages of the present invention will immediately be recognized by persons of ordinary skill in the art with reference to the attached drawings and detailed description of exemplary embodiments as given below.

BRIEF DESCRIPTION OF THE DRAWINGS

The above and other aspects and advantages of the invention will be apparent upon consideration of the following detailed description, taken in conjunction with accompanying drawings, in which like reference characters refer to like parts throughout, and in which.

All Figures © Copyright 2011 Apple, Inc. All rights reserved.

DETAILED DESCRIPTION

Reference is now made to the drawings, wherein like numerals refer to like parts throughout.

Overview

In one salient aspect, the present invention discloses methods and apparatus for processing media signals. In one exemplary aspect, the methods and apparatus enable real-time processing of audio and video signals by a graphics processing unit (GPU) and/or a central processing unit (CPU).

A data processing device is disclosed which is able to process fixed and variable rate data using a first and second processing unit (or CPU and GPU). The processing units of the exemplary embodiments of the present invention are configured to enable efficient processing of the data by establishing one of the processors for always processing the variable rate data, and additionally providing one or more schemes for determining which of the processors will process the fixed rate data. A memory is shared between the first and second processors, which enables the processors to communicate with one another in order for these to determine which processor will process the fixed rate data. To that end, the shared memory may be used for sharing information regarding the state of the processors to one another and/or another decision-making entity.

The various schemes for determining which of the processors will process the fixed rate data may include for example a scheme for attempting to lock the second processor, which would not otherwise be tasked with processing the fixed rate data. In one embodiment, a decision-making entity continues to attempt to lock the second processing unit despite it being currently busy or locked. However, if the data to be processed is real-time audio data to be processed at a GPU, the foregoing scheme may result in glitches or skips in the audio output, as the audio data processing step is halted until the GPU becomes available. In such instances a second scheme may be used. In the second scheme, if the processing unit is locked, the data will be processed at the first processing unit.

In yet another scheme, if an unlocked processor is identified as being too busy (i.e., having more than a predetermined amount of processing left to complete) or merely immediately unavailable, the data will be processed at the first processing unit. In other words, the system will once again quit trying to delegate the task if the processor is unavailable/busy.

Figure 4:
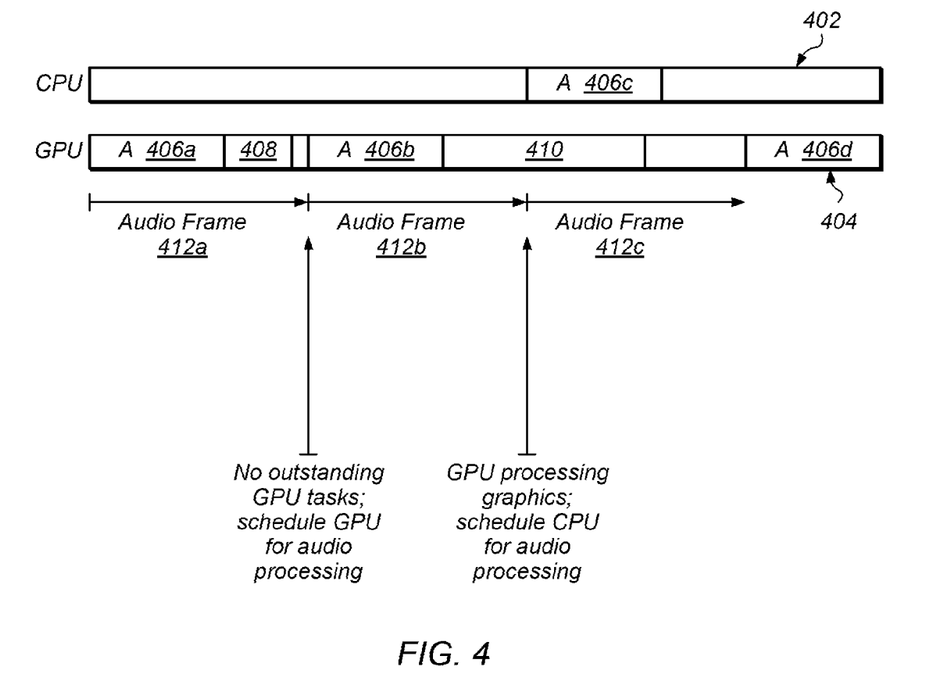
FIG. 4 is a graphical representation of one exemplary use case scenario according to the invention.

FIG. 4 provides a graphical illustration of data being processed by a CPU and a GPU. Processes being performed over time by the CPU are shown in CPU process bar 402. Processes being performed over time by the GPU are shown in GPU process bar 404. Processes 406a-406d represent processing of four consecutive blocks of real-time audio data.

At the start of audio frame 412a, the GPU is scheduled to perform audio process 406a. Upon completion of audio process 406a, the GPU is scheduled to perform graphics process 408, representing processing of a block of video data. However, the GPU completes graphics process 408 before the end of audio frame 412a. Thus, at the start of audio frame 412b, GPU process bar 404 is empty, indicating that the GPU has no scheduled tasks. Therefore, the GPU is scheduled to perform audio process 406b.

Upon completion of audio process 406b, the GPU is scheduled to perform graphics process 410, representing processing of a second block of video data. At the start of audio frame 412c, the GPU is still performing graphics process 410. Because the real-time audio data must be processed immediately, the system does not wait for the GPU to become available. Instead, the CPU is scheduled to perform audio process 406c. The GPU then completes graphics process 410 before the end of audio frame 412c, allowing the GPU to be scheduled to perform audio process 406d during the next audio frame.

Data Processing Device

Figure 2:
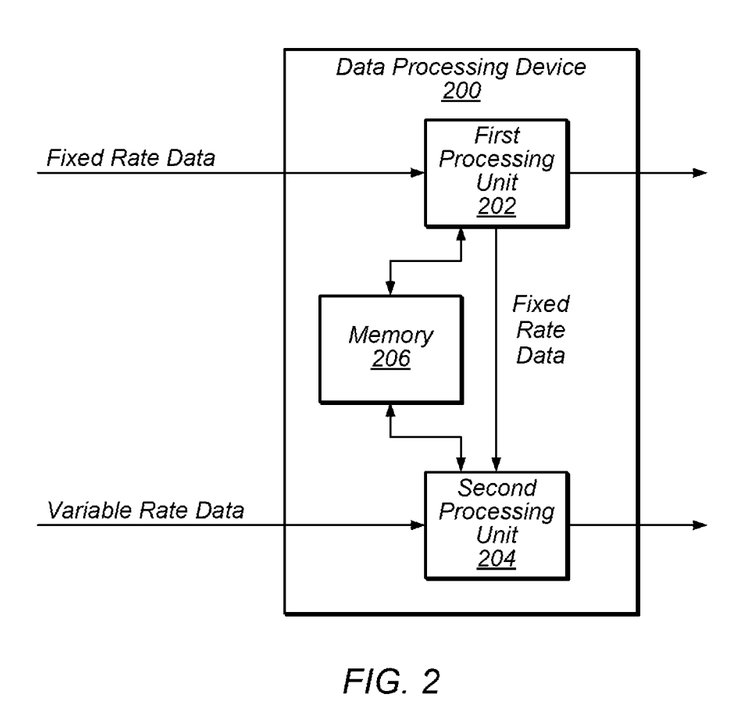
FIG. 2 is a functional block diagram illustrating an exemplary data processing device according to one embodiment of the invention.

Referring now to FIG. 2, one exemplary embodiment of a data processing device 200 consistent with the present invention is illustrated. The data processing device 200 is configured to process fixed and variable rate data. As shown, the exemplary device 200 includes a first processing unit 202 and a second processing unit 204. The first processing and second processing units may comprise one or more central processing units (CPU), graphics processing units (GPU), digital signal processors (DSP), field-programmable gate arrays (FPGA), and/or complex programmable logic devices (CPLD), etc. The processing units 202, 204 of the present invention are configured to enable efficient processing of the data by establishing one of the processors for always processing the variable rate data, and additionally providing one or more schemes for determining which of the processors will process the fixed rate data. In the illustrated embodiment, the first processing unit 202 receives the fixed rate data from a source entity (not shown), and the second processing unit 204 receives the variable rate data from the source entity. Hence, although the second processing unit 204 is responsible for processing all of the variable rate data, it may receive fixed rate data from the first processing unit 202 for processing as well.

A memory 206 is shared between the first and second processors 202, 204. The memory 206 enables the processors to communicate with one another in order for these to determine which processor will process the fixed rate data. The memory 206 is suitable for transferring codec operations and data and codec results between the first and second processors. As will be discussed in greater detail below, in one exemplary embodiment, commands are placed in a queue (or bin) of the shared memory 206. The commands relate to tasks which are to be performed by the second processor 204 (i.e., the processor which will take on fixed rate data processing in addition to variable rate data processing functions). The shared memory may utilize a first in, first out (FIFO) or last in, first out (LIFO) method for eliminating tasks therefrom. Additionally, the queue on the shared memory 206 may be utilized by the processors as an indicator of whether one or the other processor is currently busy (i.e., has tasks to perform).

Additionally (as will be discussed in greater detail below), the shared memory or other means of communication between the processors may be used for sharing information regarding the state of the processors to one another. The state information exchange may occur by one processor querying the other, or by one or the other processor simply providing the information to the other (such as periodically, or as a change is made).

Various user interface components (e.g., video display, camera, speaker, microphone, etc.) of the device 200 have been omitted for clarity. In some embodiments, such user interface components may include other user interface functions, including but not limited to: touch screen input, keyboard input, mouse input, etc.

Figure 3:
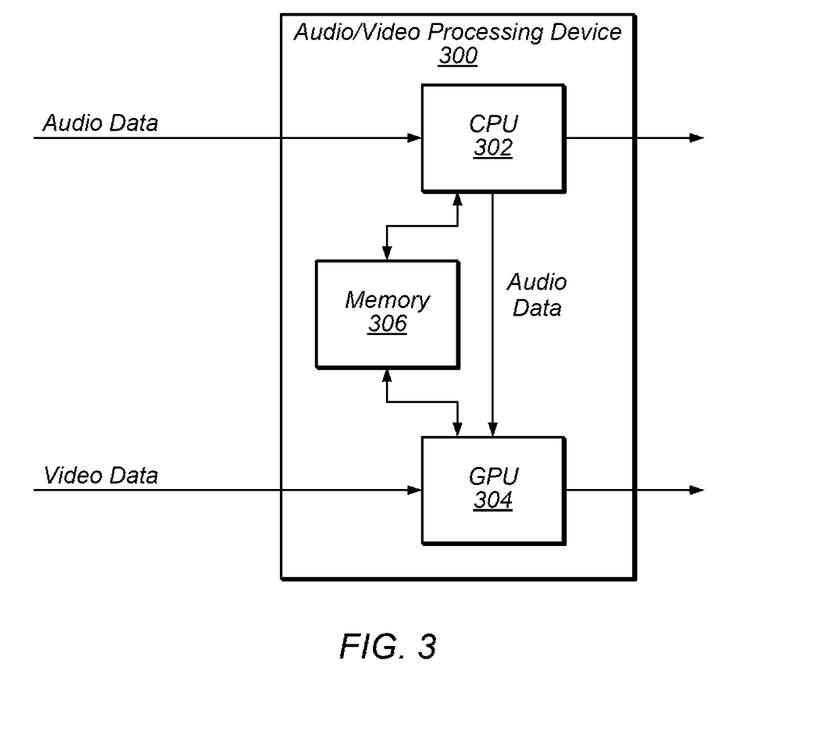
FIG. 3 is a functional block diagram illustrating a specific embodiment of the data processing device of FIG. 2.

In one specific implementation, the data processing device may comprise an audio/video processing device 300 as illustrated in FIG. 3. The data processed in this embodiment comprises audio/video data of various codec including, without limitation, those of the MPEG (e.g., MPEG-1, MPEG-2, MPEG-4/H.264, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421M) families. The audio/video processing device 300 of FIG. 3 generally comprises at least one central processing unit (CPU) 302 and at least one graphics processing unit (GPU) 304.

Audio data is provided to the CPU 302 from a source entity (not shown). The audio data may be processed by the CPU 302 or alternatively provided to the GPU 304 for processing. The GPU 304 is additionally responsible for processing all video data. Hence, the GPU 304 receives video data from the source entity also. The audio and video data may be stored as a series of audio and video codec operations on a storage apparatus. The storage entity containing the multimedia file (audio/video data) may be associated with the device 200, or located remotely therefrom. Alternatively, the multimedia file may be streamed from a content delivery network or read from a physical media.

Furthermore, as illustrated in FIG. 3, the CPU 302 and GPU 304 share one or more memories 306. As noted above, the shared memory 306 enables the CPU 302 and GPU 304 to communicate with one another. Audio processing tasks may be posted by the CPU 302 to a queue on the shared memory for completion by the GPU 304. Additionally, as disclosed elsewhere herein, the CPU 302 may read the queue of the memory 306 to determine whether the GPU 304 is busy (i.e., has one or more processing tasks to perform).

In one exemplary embodiment, commands are placed in a queue (or bin) of the shared memory 206, 306. For example, the memory may be segmented such that a first portion of the memory may only be read by the first processor and written to by the second processor, and a second portion of the memory may only be read by the second processor and written to by the first processor. In this manner, tasks to be completed by the second processor may be listed in the first portion of the memory and the first processor may place additional tasks for completion by the second processor into the second portion of the memory. In one exemplary embodiment, the foregoing arrangement may be used to cause a second processor 204 to take on fixed rate data processing (as instructed to by the first processor 202) in addition to its variable rate data processing functions. For example, a GPU 304 may be instructed to process audio data.

As noted above, the shared memory 206, 306 may utilize FIFO or LIFO methods for eliminating tasks from the second processor 204 or GPU 304 queue. Also as noted above, the queue on the shared memory may be utilized by the processors as an indicator of whether one or the second processor 204 or GPU 304 is currently busy (i.e., has tasks to perform).

Furthermore, as was noted above with respect to the processors 202, 204 of the device 200 of FIG. 2, the GPU 204 and CPU 202 may exchange state information via a common interface in the shared memory 206, 306.

The state information is useful in enabling the processing device 200, 300 to determine whether to process the fixed rate data at the first or second processor. In the embodiment of FIG. 3, this determination relates to where the audio data will be processed, either at the CPU 202 or at the GPU 204. The processing device 200, 300 may use one of a plurality of schemes for making the determination as illustrated by the state diagrams of FIGS. 4-7.

As discussed herein, the first processor may in one embodiment comprise a CPU and the second processor may in one embodiment comprise a GPU (as illustrated in FIG. 3 above). However, other processing entities may utilize the herein-described methods with equal success.

Figure 5:
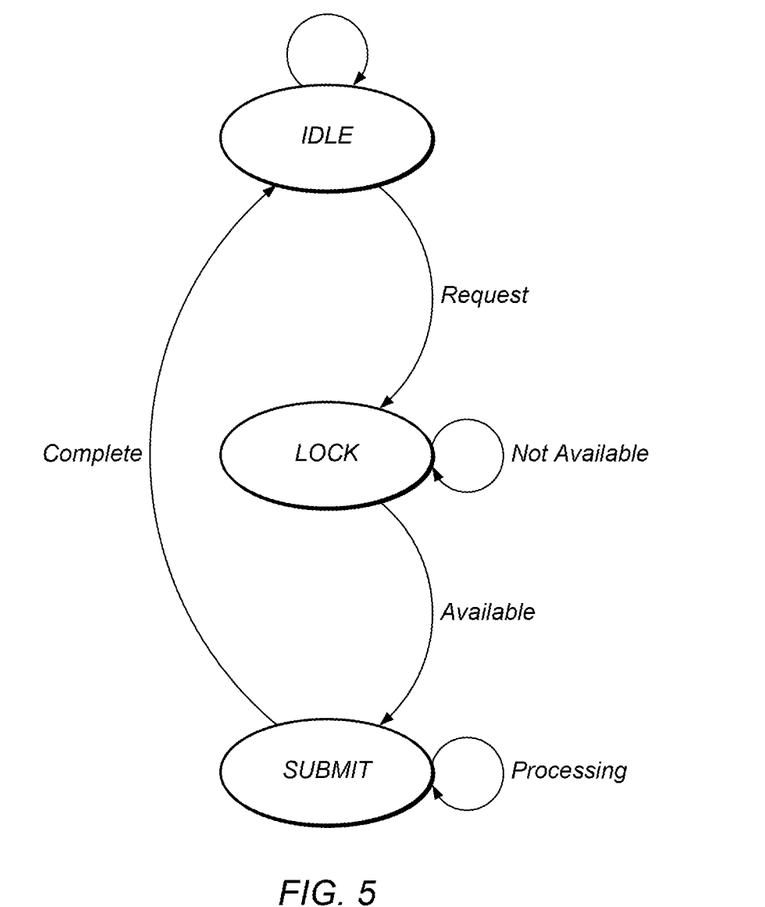
FIG. 5 is a functional block diagram illustrating an exemplary state machine of a first processing unit of the exemplary data processing device of FIG. 2 using a first determination scheme for processing fixed rate data signals.

Referring now to FIG. 5, a first embodiment of a state diagram of the decision-making entity using a first scheme to determine whether to cause data to be processed at a first 202 or second 204 processor is illustrated. In one embodiment, the decision-making entity comprises the first processing unit 202 of the processing device 200. Alternatively, the decision-making entity may comprise the CPU 302 of the audio/video processing device 300. In the instance the processing comprises processing of audio/video data, a decision-making entity uses the first scheme (illustrated by the state diagram of FIG. 5) to determine whether the GPU 204 or CPU 202 should process audio data.

In the illustrated embodiment, the decision-making entity (first processor 202 or CPU 302) has three states: IDLE, LOCK and SUBMIT. The decision-making entity is in the IDLE state when no requests are pending. A request occurs when data is identified as needing to be processed. The request to the decision-making entity to process data triggers the decision-making entity to transition to the LOCK state. In the LOCK state, the decision-making entity attempts to lock the second processor 204 (or GPU 304) for performing the requested processing. According to this embodiment, the attempts to lock the second processor 204 continue until the processor 204 is available. That is, if the processor 204 is locked (such as by being in use for processing other data), the decision-making entity will continue its attempts to lock the second processor 204 until it becomes available (i.e., completes its current processing cycle and is unlocked or released). Once the decision-making entity succeeds to lock the second processor 204, it transitions to a SUBMIT state. At the SUBMIT state, the decision-making entity provides the data which is to be processed to the second processor 204. The second processor 204 processes the submitted data as necessary. When processing is complete, the decision-making entity transitions back to IDLE and awaits another request.

In the foregoing embodiment, as noted, the decision-making entity will continue to attempt to lock the second processing unit 204 despite it being currently busy or locked. However, in the instance the data to be processed is real-time audio data, such a scheme may result in glitches or skips in the audio output, as the audio data processing step is halted until the GPU 204 becomes available.

Figure 6:
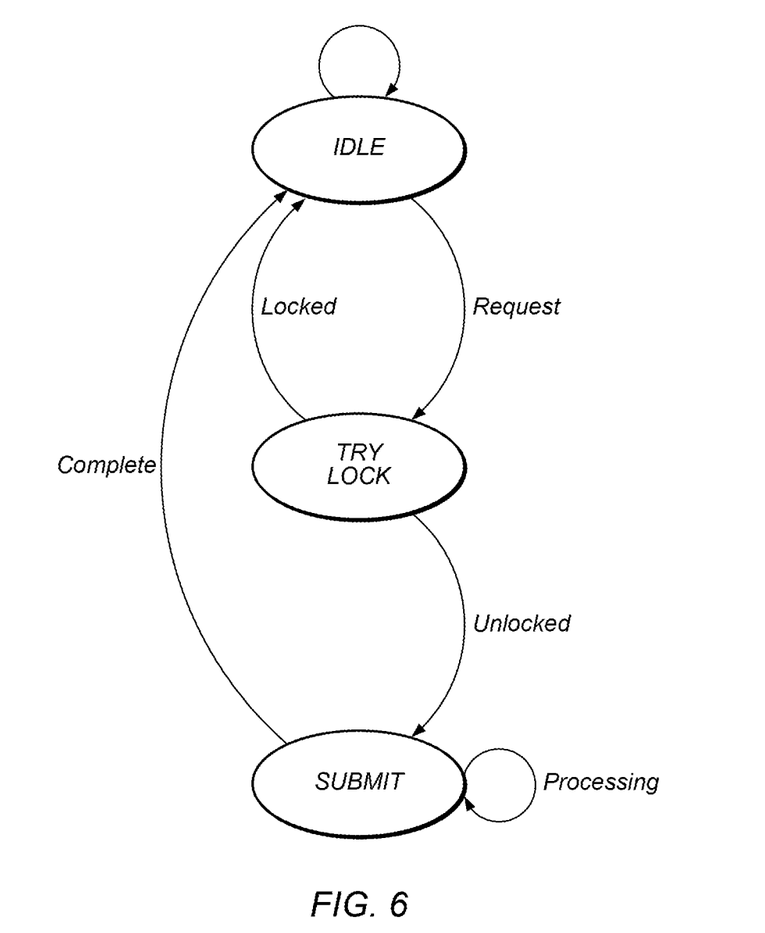
FIG. 6 is a functional block diagram illustrating an exemplary state machine of a first processing unit of the exemplary data processing device of FIG. 2 using a second determination scheme for processing fixed rate data signals.

In order to rectify the aforementioned problem with skipping and/or glitches, a second embodiment of a state diagram of the decision-making entity (such as the first processor 202 or the CPU 302) using a second scheme to determine whether to cause data to be processed at the first 202 or second 204 processing units (e.g., CPU 302 or GPU 304) is illustrated in FIG. 6. As shown, the exemplary implementation of the decision-making entity according to the second scheme may have three distinct states: IDLE, TRY LOCK and SUBMIT. As was discussed above, the decision-making entity remains in the IDLE state until a request for processing data is received. When a request is received, the decision-making entity transitions to a TRY LOCK state. In the TRY LOCK state, the decision-making entity attempts to discover whether the second processing unit 204 (or GPU 304 in the embodiment of FIG. 3) is currently locked. If the second processing unit 204 is locked, the decision-making entity returns to its IDLE state and causes the first processing unit 202 (or CPU 302) to perform the requested data processing. In other words, according to this embodiment, if the second processing unit which is not generally used for processing the type of data which is to be processed is locked, the decision-making entity will default back to the processing unit which is normally used for processing that type of data.

Alternatively, if the second processing unit 204 is not locked, the decision-making entity transitions to the SUBMIT state. In the SUBMIT state, the decision-making entity causes the data to be processed to be transmitted to the second processing unit 204 for processing there. In one embodiment, the decision-making entity may cause the data to be transmitted from the first processing unit 202 to the second processing unit 204. When processing at the second processing unit 204 is complete, the decision-making entity transitions back to its IDLE state and awaits another processing request. In an alternative embodiment, the completion of submission of the data to the second processing unit 204 may trigger the decision-making entity to transition back to IDLE. In other words, the decision-making entity need not wait for data processing to be completed at the processing unit in order to transition to IDLE and/or accept another processing request.

In the embodiment of FIG. 6, there remains a possibility that the second processing entity 204, although unlocked may still have one or more tasks to complete before it will be available to process the data sent to it via the decision-making entity. Thus, at the time the processing unit 204 is accessed, it may not be able to immediately begin processing data. In the instance that the GPU 204 is being requested to process audio data in real time, the GPU 204 being busy (as may occur in the embodiment of FIG. 6) creates a problematic lag in processing.

Figure 7:
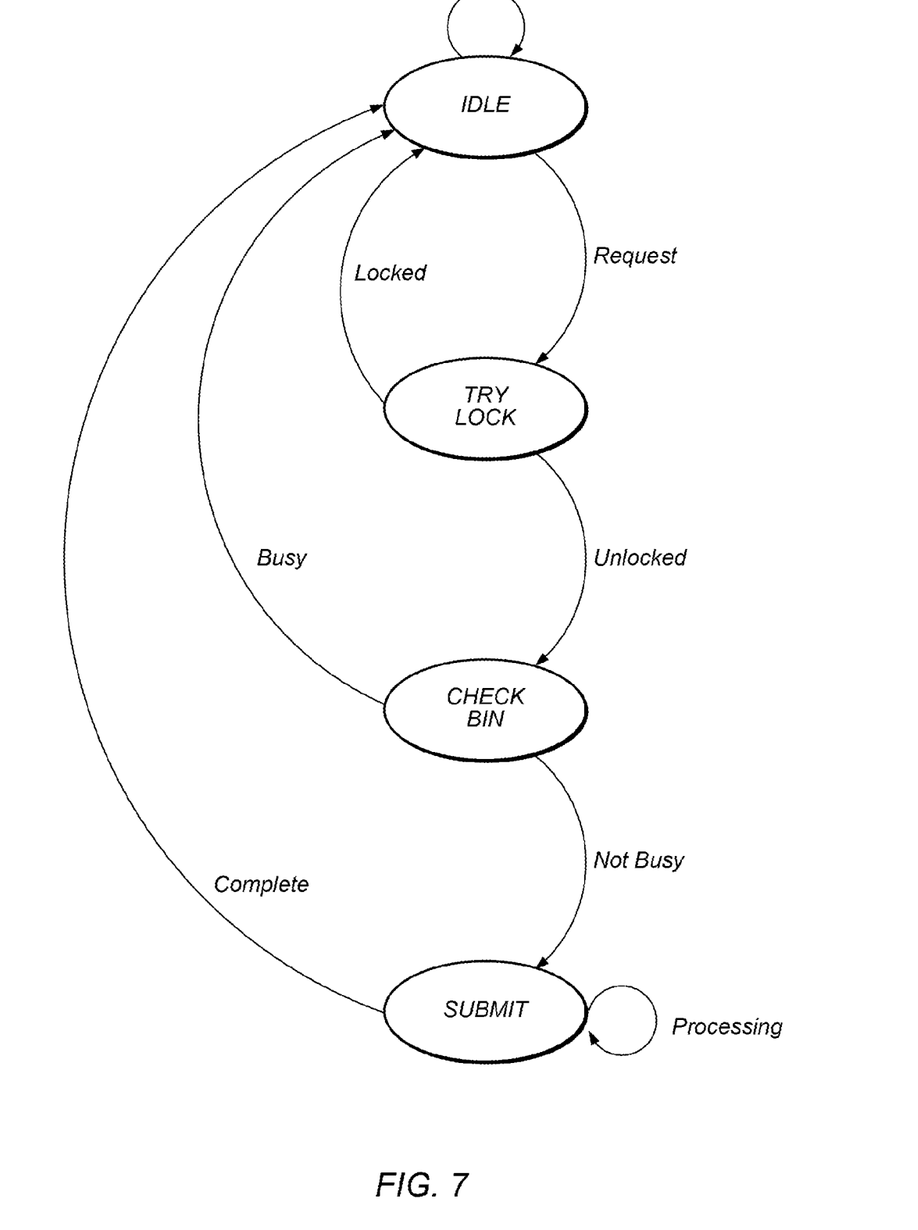
FIG. 7 is a functional block diagram illustrating an exemplary state machine of a first processing unit of the exemplary data processing device of FIG. 2 using a third determination scheme for processing fixed rate data signals.

To avoid the aforementioned lag, a third exemplary scheme illustrated by state diagram of FIG. 7 may be used. As shown, the decision-making entity according to this embodiment has the following four states: IDLE, TRY LOCK, CHECK BIN, and SUBMIT. The decision-making entity remains in IDLE until a request for processing data is received. When the request is received, the decision-making entity transitions to the TRY LOCK state, where it is determined whether the second processing unit 204 is currently locked or unlocked. If the second processor 204 is locked, the decision-making entity returns to its IDLE state and causes the data to be processed at the first processor 202. Alternatively, if the second processor 204 is not locked, the decision-making entity transitions to the CHECK BIN state.

At the CHECK BIN state, the decision-making entity determines whether the second processing entity 204 currently has tasks which it must complete in its queue (or bin). In other words, the decision-making entity determines whether the processor 204 is busy or immediately available. This may be accomplished by reviewing pending tasks in the shared memory (discussed elsewhere herein). If the second processor 204 is busy, the decision-making entity transitions back to the IDLE state and causes processing to be completed at the first processing entity 202. Alternatively, if the second processing unit 204 is not busy (i.e., has no tasks to complete in its queue), the decision-making entity transitions to the SUBMIT state and causes the data to be transmitted to the second processing entity 204 for processing. Once processing or submission is complete, the decision-making entity transitions back to IDLE and is ready to receive another processing request.

Figure 8:
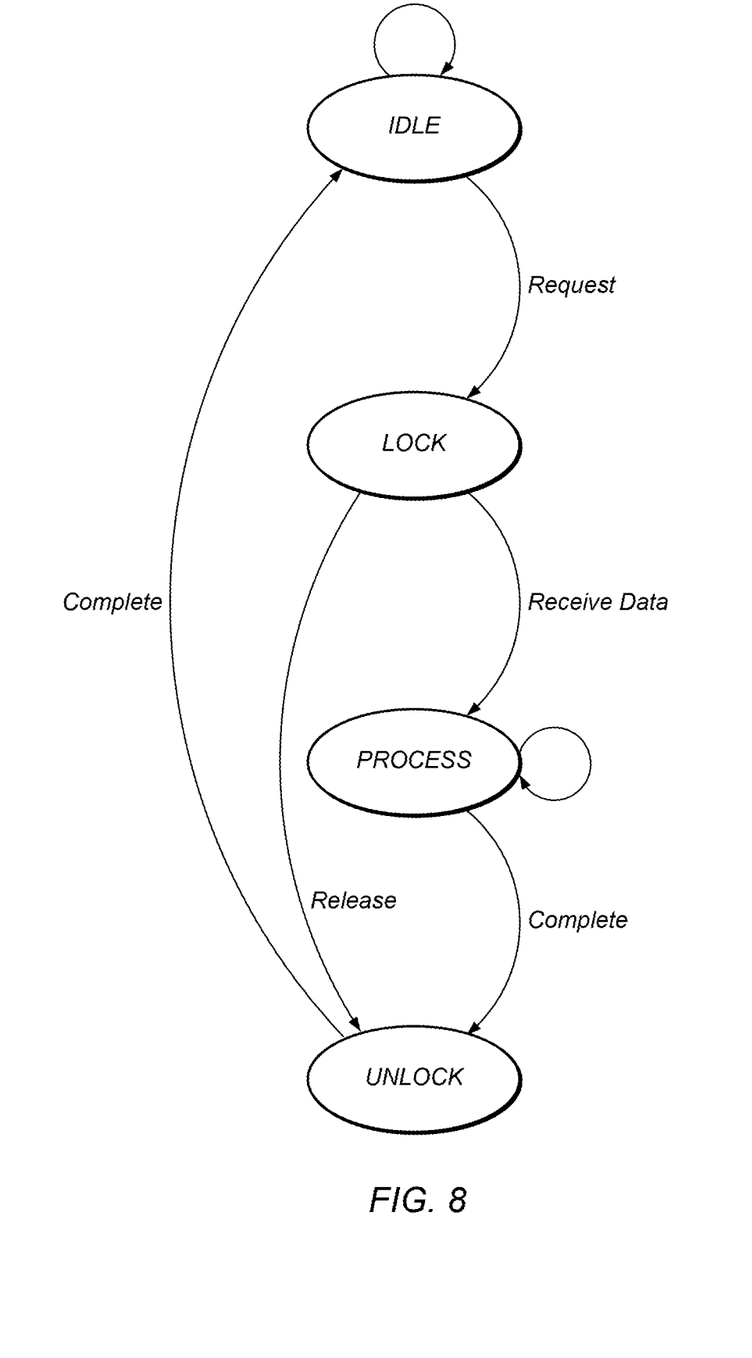
FIG. 8 is a functional block diagram illustrating an exemplary state machine of a second processing unit of the exemplary data processing device of FIG. 2 using any of a first, second or third determination scheme for processing fixed rate data signals.

Referring now to FIG. 8, an exemplary state machine for the second processing entity 204 (or GPU 304) is illustrated. It is noted that the exemplary state machine of FIG. 8 remains unchanged regardless of whether the first, second or third scheme is employed by the decision-making entity.

As shown, the second processor 204 rests in IDLE until a request is received. Upon receipt of a request from the decision-making entity, first processor 202, or CPU 302 to do so, the second processor 204 is transitioned to a LOCK state. In one variant, the second processor 204 is only locked if the decision-making entity has determined that the resource will be used for data processing. In another variant, the GPU 204 may only be locked for a short period of time, and then released. This may occur, for example, if the decision-making entity locks a previously unlocked second processor 204 during the time that is used to determine whether the second processor's 204 queue or bin has one or more outstanding tasks. If the bin is full, the second processor 204 may be released, thus causing the processor 204 to transition back to an UNLOCK state. Upon receipt of the data to be processed, the second processor 204 is transitioned from the LOCK state to a PROCESS state, in which it processes the data. When processing is complete, the second processor transitions to an UNLOCK state, and then back to its IDLE state, where it awaits another request.

Exemplary Methods

Figure 9:
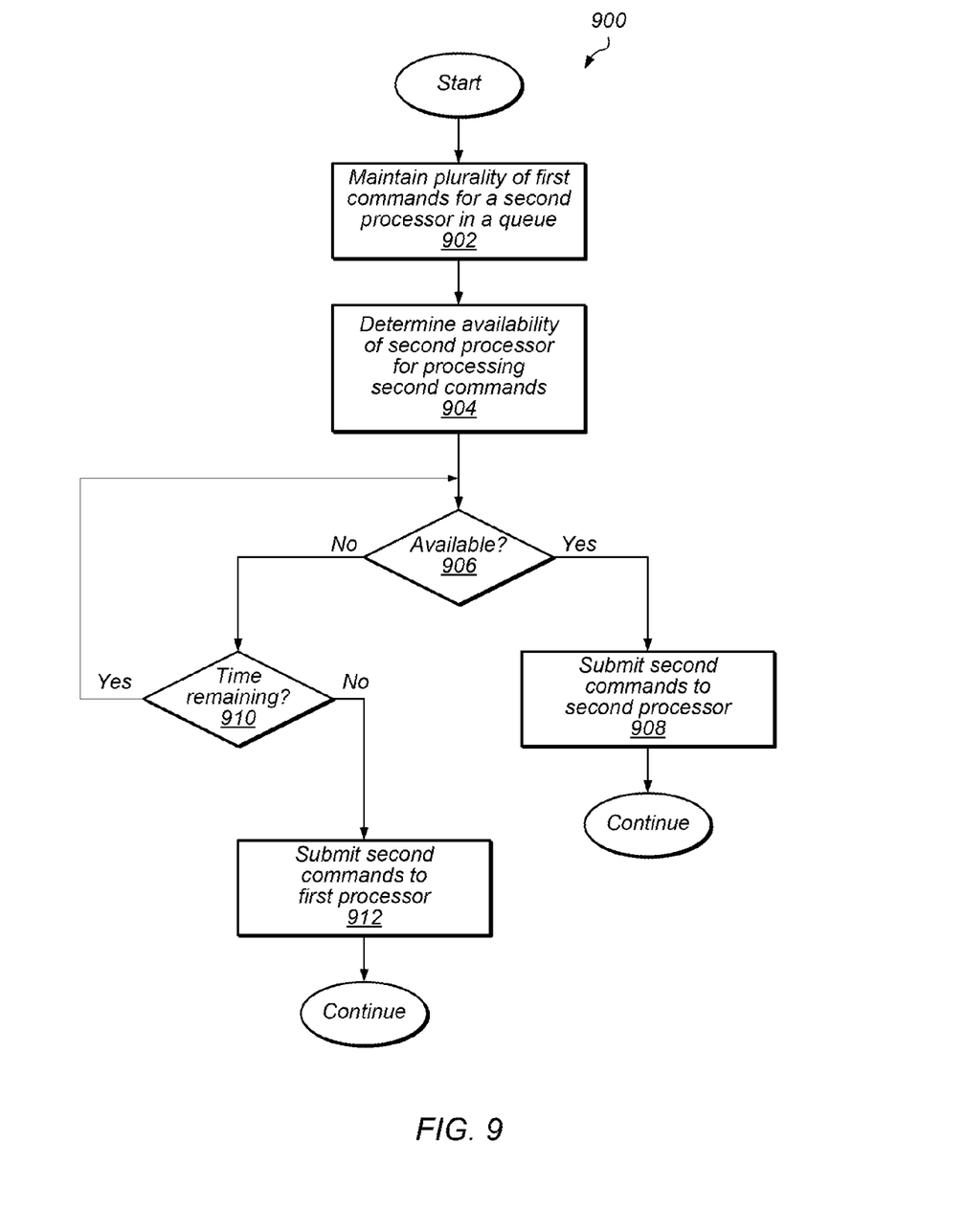
FIG. 9 is a logical flow diagram illustrating an exemplary method for operating a data processing device according to the present invention.

FIG. 9 illustrates a generalized method 900 for processing data using at least two processors. In one exemplary embodiment the processed data comprises at least one fixed rate data stream, and at least one variable rate data stream. Furthermore, in one such variant at least one of the data streams cannot be preempted.

The first step in the method (step 902) is to maintain a first plurality of outstanding commands to be submitted to a second processor. Common implementations of such a first plurality of outstanding commands include, but are not limited to, arrays, linked lists, hash tables, heaps, B-trees, red-black trees, stacks, and queues. In one embodiment, the plurality of outstanding commands to be submitted to the second processor includes graphics commands, although it will be appreciated that other types of commands may be used as well, or in place of, the aforementioned graphics commands. In another embodiment, the plurality of outstanding commands to be submitted to the second processor comprises a variable frame rate. In other embodiments, a plurality of outstanding commands is maintained for a second processor, where the second processor comprises a GPU, a CPU, a DSP, an FPGA, or a CPLD.

The second step in the method (step 904) includes, prior to the submission of one of a second plurality of outstanding commands, determining whether one of the first plurality of commands is outstanding for the second processor. In some embodiments of the present invention, the second plurality of outstanding commands comprises audio processing commands. In a second embodiment, the second plurality of outstanding commands comprises fixed rate processing commands. In another embodiment, the second plurality of outstanding commands comprises real-time processing commands. In another embodiment, the second plurality of outstanding commands utilizes an interrupt, a busy signal, a timer, or another technique to determine whether or not one of the first plurality of commands is outstanding for the second processor.

The third step in the method (step 906) is to determine whether the second processor is available. If the second processor is available, per step 908, one of the second plurality of outstanding commands is submitted to the second processor for processing. In one embodiment, the second plurality of commands comprises audio commands, and the second processor comprises a GPU.

If the second processor is not available, then the fourth step in the method (step 910) is to determine whether the second plurality of commands can accommodate a delay to wait for the second processor to become available. In some embodiments, additional advantages may result from processing the second plurality of commands on the second processor. For example, the second processor may consume less power than the first processor. Thus, it may be beneficial for to wait for the second processor to become available. However, because the second plurality of outstanding commands may comprise fixed rate processing commands in some embodiments, processing of the next command of the second plurality of commands may need to begin within a fixed amount of time. If sufficient time remains before the processing must begin, the method returns to step 906, and determines again whether the second processor has become available. In some embodiments, a time delay may pass before returning to step 906. If insufficient time remains, then one of the second plurality of outstanding commands is submitted to the first processor, per step 912. In one embodiment, the first processor comprises a CPU.

Figure 10:
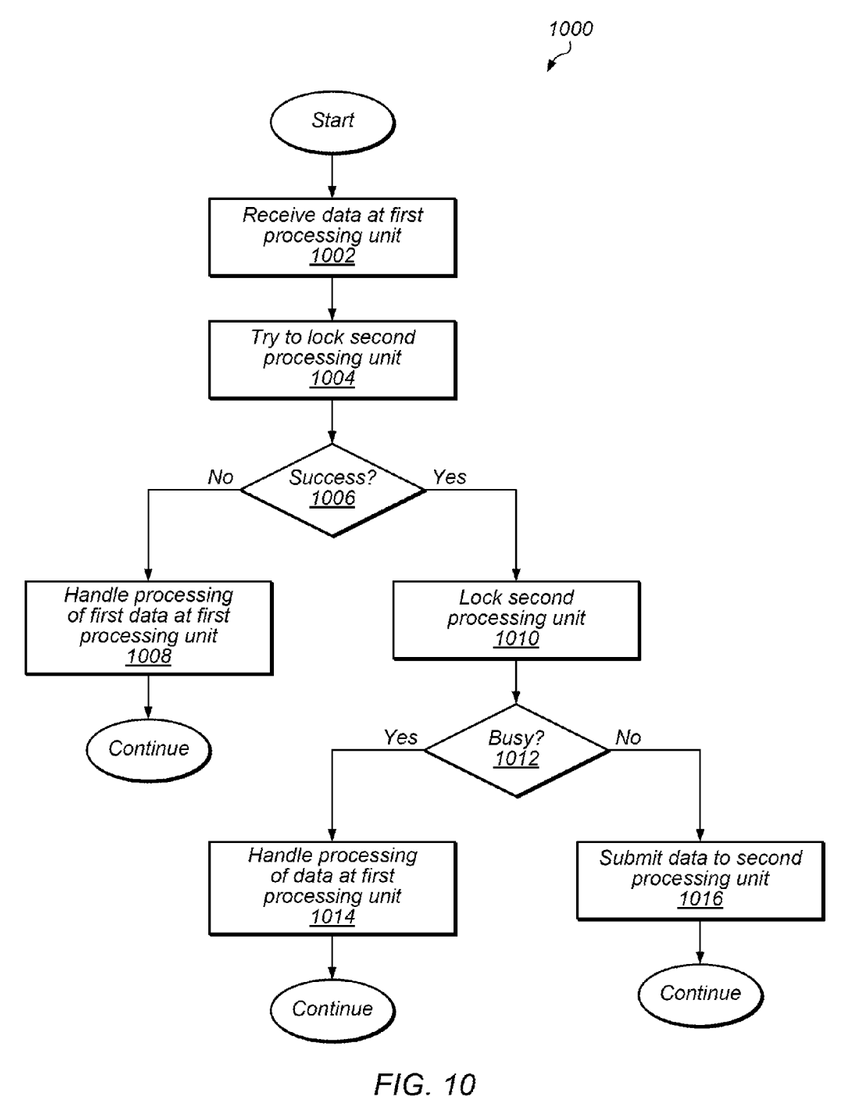
FIG. 10 is a logical flow diagram illustrating one embodiment of a method for selecting an entity for processing fixed rate data signals.

FIG. 10 illustrates a detailed, exemplary embodiment of a method 1000 for selecting an entity for processing fixed rate data signals. Per step 1002 of the method, data for processing is received at a first processing entity. The processing may comprise, for example, the first processor 202 of FIG. 2 or the CPU 302 of FIG. 3. Additionally, the data in one exemplary embodiment may comprise audio data or other fixed rate data to be processed in real time.

Per step 1004, an attempt is made to lock the second processor (processor 204 or GPU 304). If the attempt to lock the second processor is not successful (step 1006), then, per step 1008, the processing of the data is handled at the first processor. If however, the attempt to lock the second processor (step 1006) is successful, then per step 1010, the second processor is locked.

Next, at step 1012, it is determined whether the second processor is busy. The availability of the second processor may comprise immediate availability (i.e., an instance where there are no pending tasks for the processor to complete). Alternatively, one or more business rules may be implemented for determining whether the availability of the second processor is sufficient. For example, it may be determined that a certain amount of time estimated to complete processing on outstanding tasks or number of remaining tasks may be acceptable and still meet the real-time or other requirements for processing the data.

If the second processor is too busy or unavailable to immediately handle processing of the data, per step 1014, processing of the data is handled at the first processor. If, however, the second processor is available or not too busy, the data will be transmitted to the second processing unit for processing.

Figure 11:
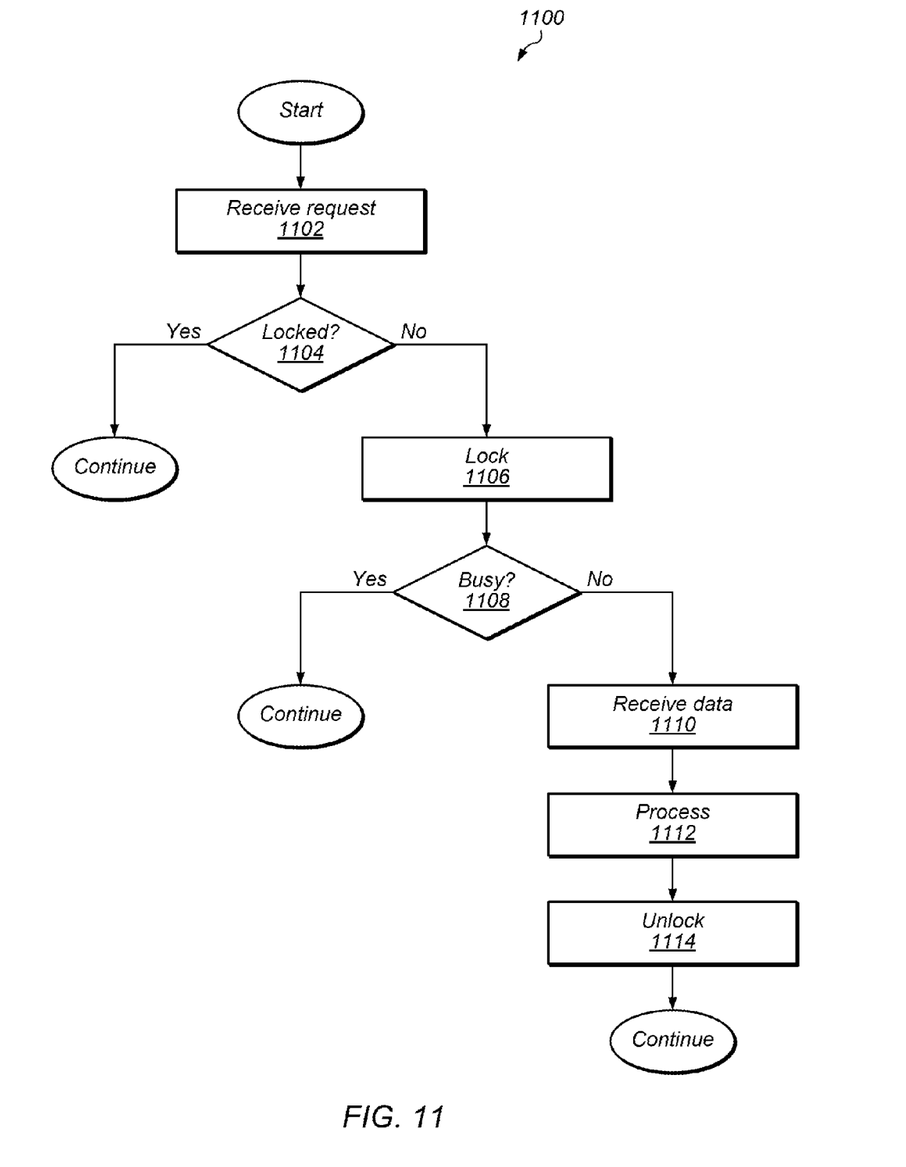
FIG. 11 is a logical flow diagram illustrating one embodiment of a method for processing fixed rate data signals.

FIG. 11 illustrates an exemplary embodiment of a method 1100 for processing fixed rate data signals. In one embodiment, the method of FIG. 11 is performed at the second processing entity 204 or GPU 304.

Per step 1102, a request is received at the second processing unit to process content. In one embodiment, the data to be processed comprises audio data to be processed in real-time by a GPU 304. Alternatively, the data may comprise any fixed rate data to be processed by a second processor 204 which does not ordinarily process that type of data.

If the processor is locked (step 1104), the method ends. In one embodiment, this may mean handling processing of the data at a different entity (such as at a first processor 202 or CPU 302). In another embodiment, if the processor is locked, after a pre-determined period of time, additional attempts to determine whether the processor remains locked are made.

If the processor is not locked (step 1104), at step 1106 it is locked by the requesting entity (such as a decision-making entity discussed above, a first processor 202, or a CPU 302). Next, it is determined whether the processor is busy (step 1108). As noted above, the determination of the processor's availability may be immediate, such that any pending tasks disqualify the processor as being available. Alternatively, the availability of the processor may be a function of the time needed to complete processing any pending tasks and/or the number of outstanding tasks to be completed. If the processor is busy, the method ends. In one embodiment, this may entail waiting until the processor is no longer busy, or simply handling processing of the data at a different entity (such as e.g., the first processor 202 or CPU 302).

If the processor is not busy, the processor receives the data to be processed at step 1110, and processes the data at step 1112. When processing is completed, the processor may be unlocked at step 1114.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention. The scope of the invention should be determined with reference to the claims.

What is claimed is:

1. A computerized apparatus configured to process data, comprising:
   a central processing unit configured to process audio data;
   a graphics processing unit in data communication with the central processing unit, and configured to process at least audio and video data;
   a delegating entity configured to:
      select one of the central processing unit or the graphics processing unit to process the audio data, wherein the selection is based at least in part on a locking state of the graphics processing unit at a time that a request for processing of the audio data is received; and
      cause the audio data to be processed at the selected one of the central processing unit or the graphics processing unit.

2. The apparatus of claim 1, wherein the delegating entity is the central processing unit.

3. The apparatus of claim 2, wherein the delegating entity is configured to select the graphics processing unit to process the audio data in response to the delegating entity determining that the graphics processing unit is in an unlocked state.

4. The apparatus of claim 2, wherein the delegating entity is configured to select the graphics processing unit to process the audio data in response to the delegating entity determining that the graphics processing unit is in an unlocked state and that the graphics processing unit is immediately available to process the audio data.

5. The apparatus of claim 2, wherein causing the audio data to be processed by the graphics processing unit comprises:
   placing the graphics processing unit in a locked state; and
   transmitting the audio data to the graphics processing unit for processing.

6. A method for efficiently processing audio and video data at a processing device comprising a central processing unit (CPU) and a graphics processing unit (GPU), the method comprising:
   receiving a request for processing audio data;
   determining whether the GPU is in a first operational state;
   determining whether the GPU is in a first availability state;
   when the GPU is determined to be in the first operational state and the GPU is determined to be in the first availability state, transmitting the audio data to the GPU for processing; and
   when the GPU is not in both the first operational state and the first availability state, causing the audio data to be processed at the CPU.

7. The method of claim 6, wherein the first operational state comprises an unlocked state of the GPU and wherein the first availability state comprises an immediately available state.

8. The method of claim 6, wherein the first operational state comprises an unlocked state of the GPU and wherein the first availability state comprises an availability determined to be sufficient for processing the audio data.

9. The method of claim 6, further comprising, when the GPU is determined to be in the first operational state, changing the operational state to a second operational state.

10. The method of claim 9, wherein the second operational state comprises a locked state.

11. The method of claim 6, wherein the receiving and the determining are performed by the CPU.

12. A non-transitory computer readable memory medium comprising program instructions for delegating processing of audio data from a central processing unit (CPU) to a graphic processing unit (GPU) of a processing apparatus, wherein the program instructions are executable to:
> write a first plurality of tasks to a queue, wherein the queue is associated with the GPU, wherein the tasks are executable by the GPU;
> identify a second plurality of tasks relating to processing the audio data, wherein each of the CPU and the GPU is capable of executing the second plurality of tasks;
> determine whether the second plurality of tasks should be written to the queue, wherein the determining is based at least in part on a level of completion of the performance of the first plurality of tasks by the GPU;
> in response to determining that the second plurality of tasks should be written to the queue, write the second plurality of tasks to the queue.

13. The non-transitory computer readable memory medium of claim 12, wherein the program instructions are further executable to:
> in response to determining that the second plurality of tasks should not be written to the queue, cause the CPU to perform the second plurality of tasks.

14. The non-transitory computer readable memory medium of claim 12, wherein the program instructions are executed by the CPU.

15. The non-transitory computer readable memory medium of claim 12, wherein, in determining that the second plurality of tasks should be written to the queue, the program instructions are executable to determine that none of the first plurality of tasks remain in the queue.

16. The non-transitory computer readable memory medium of claim 15, wherein in determining that the second plurality of tasks should be written to the queue, the program instructions are executable to determine that performance of the first plurality of tasks is complete.

17. The non-transitory computer readable memory medium of claim 12, wherein, in determining that the second plurality of tasks should be written to the queue, the program instructions are executable to:
> determine that at least a subset of the first plurality of tasks remain in the queue;
> determine, in response to the determining that at least a subset of the first plurality of tasks remain in the queue, that processing of the second plurality of tasks may be delayed by a first amount of time without causing errors in the audio data;
> determine, before the first amount of time elapses, that none of the first plurality of tasks remain in the queue.

18. The non-transitory computer readable memory medium of claim 12, wherein the determining is further based on a current state of the GPU.

19. The non-transitory computer readable memory medium of claim 18, wherein, in determining that the second plurality of tasks should be written to the queue, the program instructions are executable to determine that the GPU is in an unlocked state.

20. The non-transitory computer readable memory medium of claim 19, wherein the program instructions are further executable to:
> in response to the determining that the GPU is in an unlocked state, place the GPU in a locked state.

* * * * *